Feb. 24, 1942.   V. KAUDERS   2,274,070
SHORT-CIRCUITED WINDING FOR INDUCTION MACHINES
Filed March 17, 1939   3 Sheets—Sheet 1
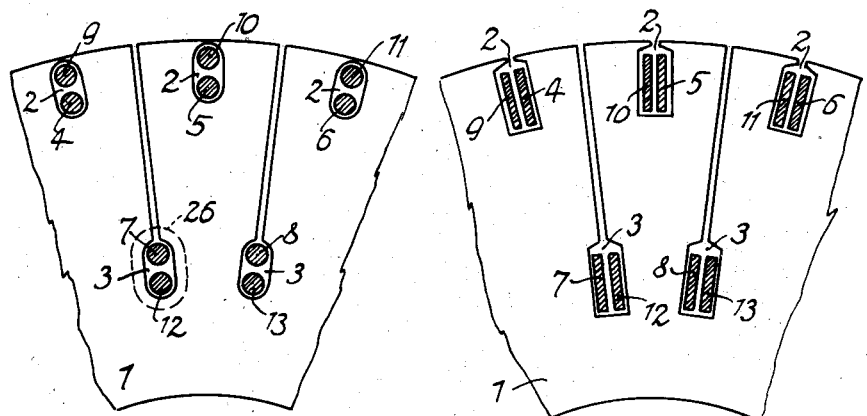
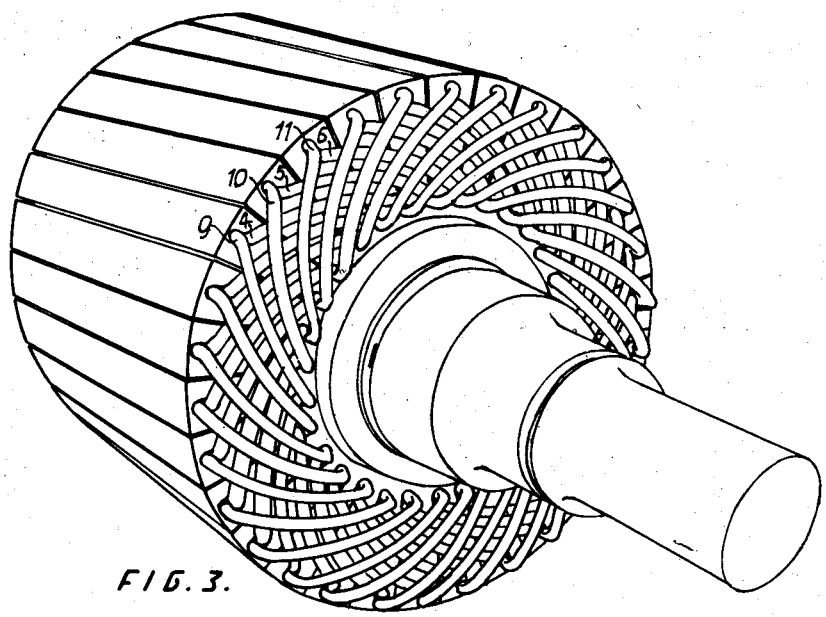
Inventor,
V. Kauders
By: Glascock Downing & Seebold
Attys.

Inventor,
V. Kauders
By: Glascock Downing Seebold
Attys.

Patented Feb. 24, 1942

2,274,070

UNITED STATES PATENT OFFICE 2,274,070

SHORT-CIRCUITED WINDING FOR INDUCTION MACHINES

Vilém Kauders, Prague, Czechoslovakia

Application March 17, 1939, Serial No. 262,557
In Czechoslovakia September 14, 1937

3 Claims. (Cl. 172—120)

This invention relates to a new winding arrangement, more particularly for improving the starting of machines, in the armature of which the frequency is variable, that is for instance for the rotors of induction motors, the damper windings of synchronous motors, which serve the purpose of starting, and the like.

The various objects and features of the invention will be readily apparent upon a consideration of the accompanying drawings and the following description wherein several exemplary embodiments of the invention are disclosed.

In the drawings:

Fig. 1 is a partial cross sectional view of the rotor showing one type of conductors.

Fig. 2 is a similar view illustrating rectangular conductors.

Fig. 3 is a perspective view of the rotor.

Figs. 4 to 13 diagrammatically illustrate different arrangements of the rotor coils and the connections thereof wherein full lines represent the conductors near the periphery having low leakage reactance and dotted lines represent conductors in slots which are further from the periphery and have large leakage reactance. Each two lines shown close together are in one common slot.

Figure 4:
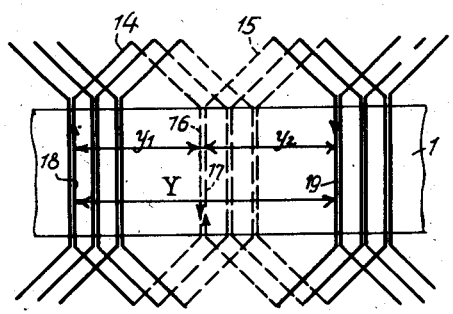

Fig. 4 shows an arrangement of a secondary with no interconnected phases. The arrows indicate the course of the currents for high secondary frequencies.

Figure 5:
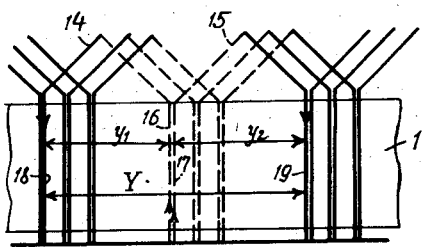

Fig. 5 shows an arrangement with all bars connected on one side of the core to an end ring. The arrows indicate the course of the currents for very low secondary frequencies.

Figure 6:
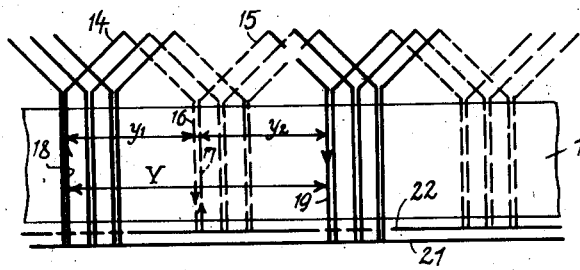

Fig. 6 shows an arrangement with two rings, one for the low reactance bars, the other for the high reactance bars. The arrows indicate the course of the currents for high secondary frequencies.

Figure 7:
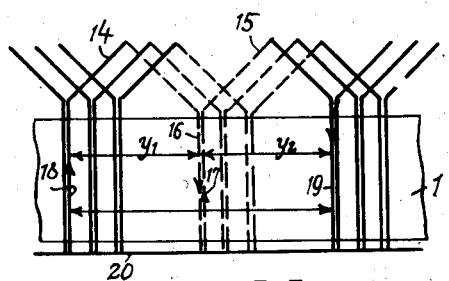

Fig. 7 shows an arrangement similar to Fig. 5 with the arrows indicating the course of the currents for high secondary frequencies.

Figure 8:
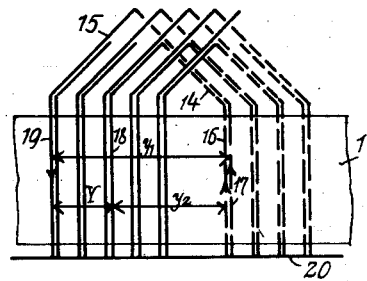

Fig. 8 shows a modification of the arrangement shown in Fig. 5 and illustrating a lap winding with the arrows indicating the course of the currents for low secondary frequencies.

Figure 9:
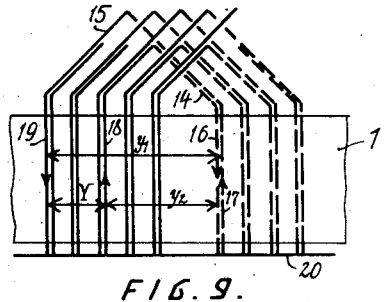

Fig. 9 shows the same arrangement as Fig. 8 but the arrows indicate the course of the currents for high secondary frequencies.

Figure 10:
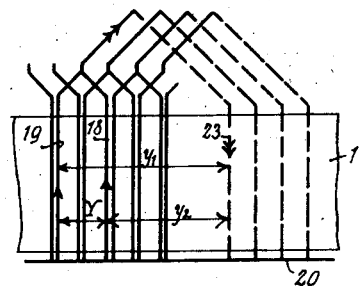

Fig. 10 shows a modification of Fig. 8 and every two bars of each high reactance slot are connected or replaced by one bar with the arrows indicating the course of the currents for low frequencies.

Figure 11:
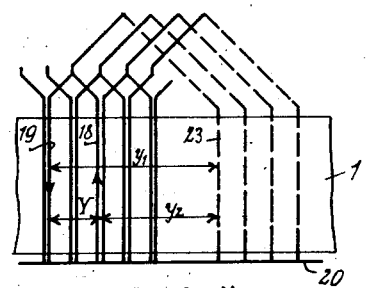

Fig. 11 shows the winding according to Fig. 10 indicating the course of the currents for high secondary frequencies.

Figure 12:
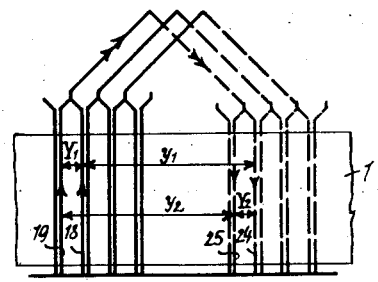

Fig. 12 shows a modification of Fig. 8 with the arrows indicating the course of the currents for low secondary frequencies.

Figure 13:
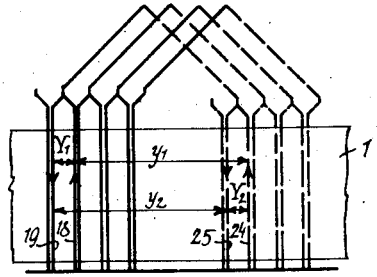

Fig. 13 shows the winding according to Fig. 12 with the arrows indicating the course of the currents for low frequencies.

Figs. 1 and 2 of the drawings show a cross-section of an armature. I are the armature laminations, 2 the slots near the periphery and 3 the slots which are further from the periphery. In the slots are arranged conductors 4, 5, 6 ... and 7, 8 ... respectively and 9, 10, 11 ... and 12, 13 ... respectively. Fig. 1 shows an arrangement which is suitable for round conductors and Fig. 2 an arrangement which is suitable for rectangular conductors.

Each two conductors form coils as shown in Fig. 3 and in Figs. 4, 5, 6 developed in the usual manner. The coils are either short-circuited each independently on itself (Fig. 4) or they are all interconnected at one side of the armature, for instance by a ring 20 (Fig. 5); or all the conductors of the outer slots are short-circuited by an independent ring 21 and all those of the inner slots by an independent ring 22 (Fig. 6).

As will be seen from Fig. 3, the arrangement according to the invention differs from a normal short-circuited two-layer winding in that half of all the slots, for instance all the odd slots, are arranged in the usual manner at the periphery and the other half, for instance all the even slots, are embedded more or less deeply in the armature iron.

At low frequencies (when running), this winding acts as a normal winding, the slots of which would all have the same reactance, namely the mean value of the reactance of all the slots. When the coils have a coil width $y_1$ or $y_2$ (Fig. 5), which as is usually the case does not differ greatly from the pole pitch or an odd multiple thereof, the winding will have a relatively small resistance and an increased reactance, when running. The arrows indicate the course of the current (Fig. 5). At high frequencies (when starting up) the two conductors of each lower slot act as a more or less effective transformer, according to the magnitude of the magnetic resistance around the slot 26. Assuming that the magnetic resistance around the lower slots 26 is very small, the currents 16 and 17 in the lower slots must flow as in every transformer practically in opposition to one another, as is indicated in Figures 4, 6 and 7. The lower slots will thus have no magnetomotive effect, so that every two coils 14 and 15 will have only one conductor 18 and 19 respectively, having a magnetomotive effect, which conductors together form coils, of the coil width $Y=y_1+y_2$. According to the greatness of $y_1$ and $y_2$, Y will differ more or less from the pole pitch, so that the currents in the upper slots are also more or less displaced in phase. Owing to the great phase displacement of the currents in all the slots, the resultant reactance of the conductors is very small, as the magnetic field per ampere is small, so that, in spite of the voltages being small, strong currents will flow in them, which will cause considerable losses in them. Owing to the great phase displacement of the currents in all the slots the stator current is nevertheless relatively small, as it is proportional not to the great conductor current, but only to the mean value of the total flux in the upper and lower slots, which value is far smaller. The winding will therefore act just like the starting winding of a double squirrel cage motor of more or less great resistance.

As calculations and tests have shown, the "resistance" of a motor with a winding according to Fig. 3 can be increased when starting to a multiple of its value when running, the reactance dropping considerably, as already described. The starting properties of a motor with this winding are therefore considerably better that those of an ordinary squirrel cage motor and are at least as good as those of a good double squirrel cage motor.

The advantage as compared with the latter motor is not only the saving in material for the starting cage, but the considerably smaller amount of heating up when starting. Whereas, when starting up the double squirrel cage motor, the losses are almost completely disposed of in the starting cage and whereas the working cage which mostly weights more only becomes slightly heated, in the motor according to the invention the losses occur uniformly in the whole of the winding, so that with the same total weight the heating amounts to only a fractional part, for instance one third to one fifth of the heating of the starting winding. This is of particularly great advantage in the case of frequent starting and stopping or reversing.

A further advantage is, that the total number of conductors which are active when running is not arranged on one radius, as in the case of the double cage motor, but on two radii, whereby and owing to the elimination of the separate starting winding the teeth are thicker and the saturation less.

The heating of the winding which is also effective when the motor is running also has the advantage, as compared with the double squirrel cage armature, that the pull-out slip becomes temporarily greater and the torque curve flatter and that humps are more easily avoided even in the case of large motors.

As the winding consists of coils, it is also not so sensitive to harmonics and therefore has smaller torque humps or none at all, even when the number of slots is far greater than the number of slots in the stator, which is of course not permissible in the case of squirrel cage motors owing to torque humps, although it would otherwise be advantageous.

One constructional form having been accurately described and the advantages explained, it may be stated that other windings can be carried out on the same principle. Thus for instance the coils instead of being arranged as in wave winding may be arranged as in lap winding (Figs. 8 and 9), in which case $Y=y_1-y_2$. When the pitches $y_1$, $y_2$, Y are of equal size "electrically," as in Figs. 4, 5, 6, 7, the windings are equivalent. Fig. 8 shows the course of the current, when the motor is running with the frequency low and Fig. 9, when starting and the frequency is high. When any two coils are connected together in end connection, further constructional forms are obtained. If these should in each case be two coils, the conductors of which lie next to one another in the lower slots, the arrangement according to Fig. 10 is obtained with the arrows showing the directions of the currents, when running and in Fig. 11 with the arrows for starting. When these are optional coils, the arrangement according to Fig. 12 is obtained. When running, the course of the current is that of Fig. 12 and when starting that of Fig. 13.

The individual arrangements have with the same pitches different "resistances" at great frequencies; Fig. 11 about half and Fig. 13 about a quarter of Fig. 9.

The described arrangements of course do not entirely exhaust all possibilities and anyone skilled in the art will be able to suggest other arrangements on the same principle or combinations of such arrangements.

What I claim is:

1. An electric machine secondary comprising, a magnetic core member containing uniformly spaced peripheral slots of low leakage reactance and uniformly spaced slots of higher leakage reactance, two coil sides in each slot, and connections connecting two coil sides forming a first plurality of similar closed circuits through said coil sides and end connections which circuits include one-half of all coil sides in said low reactance slots and one-half of all coil sides in said high reactance slots, other end connections connecting the remaining coil sides forming a second plurality of similar closed circuits through said coil sides and end connections which latter circuits include the remaining half of all coil sides in said low reactance slots and the remaining half of all coil sides in said high reactance slots, the coil sides in any such closed circuit being spaced apart such a distance that considering two coils with their high reactance coil sides in one common high reactance slot their low reactance coil sides are spaced apart a distance differing from zero electrical degrees so that with high frequency said two sides in said high reactance slots tend to neutralize the magnetomotive force of each other by transformer action whereby the secondary tends to act as a plurality of similar coils with active conductors in low reactance slots.

2. An electric machine secondary comprising, a magnetic core member containing uniformly spaced peripheral slots of low leakage reactance and uniformly spaced slots of higher leakage reactance, two coil sides in each slot, end connections at both ends of the secondary connecting two coil sides forming a first plurality of similar closed circuits through said coil sides and end connections which circuits include one-half of all coil sides in said low reactance slots and one-half of all coil sides in said high reactance slots, the other end connections at both ends of the secondary connecting the remaining coil sides forming a second plurality of similar closed circuits through said coil sides and end connections which latter circuits include the remaining half of all coil sides in said low reactance slots and the remaining half of all coil sides in said high reactance slots, the coil sides in any such closed circuit being spaced apart such a distance that considering two coils with their high reactance coil sides in one common high reactance slot their low reactance coil sides are spaced apart a distance differing from zero electrical degree so that with high frequency said two coil sides in said high reactance slots tend to neutralize the magnetomotive force of each other by transformer action whereby the secondary tends to act as a plurality of similar coils with active conductors in low reactance slots.

3. An electric machine secondary comprising, a magnetic core member containing uniformly spaced peripheral slots of low leakage reactance and uniformly spaced slots of higher leakage reactance, two bars in each of said slots, an end ring connecting all of said bars at one end of the core, end connections at the end of the core opposite said end ring connecting two bars forming a first plurality of similar closed circuits through said bars said end connections and said end ring which circuits include one-half of all bars in said low reactance slots and one-half of all bars in said high reactance slots, other end connections at the end of the core opposite said end ring connecting the remaining coil sides forming a second plurality of similar closed circuits through said bars said other end connections and through said end ring which circuits include the remaining half of all bars in said low reactance slots and the remaining half of all bars in said high reactance slots, the bars in any closed circuit being spaced apart such a distance that considering two coils with their high reactance bars in one common high reactance slot their low reactance bars are spaced apart a distance differing from zero electrical degree so that with high frequency said two bars in said high reactance slots tend to neutralize the magnetomotive force of each other by mutual transformer action, whereby the secondary acts as a plurality of similar closed circuits through bar end connection bar in the same slot end connection bar and end ring.

VILÉM KAUDERS.